(12) United States Patent
Aurongzeb et al.

(10) Patent No.: US 9,465,455 B2
(45) Date of Patent: Oct. 11, 2016

(54) ACTIVE PEN SYSTEM

(71) Applicant: Dell Products L.P., Round Rock, TX (US)

(72) Inventors: Deeder M. Aurongzeb, Round Rock, TX (US); Charles D. Hood, III, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 66 days.

(21) Appl. No.: 14/141,200

(22) Filed: Dec. 26, 2013

(65) Prior Publication Data

US 2015/0185879 A1    Jul. 2, 2015

(51) Int. Cl.
*G06F 3/0354* (2013.01)
*G06F 1/32* (2006.01)

(52) U.S. Cl.
CPC ......... *G06F 3/03545* (2013.01); *G06F 1/3259* (2013.01); *Y02B 60/1253* (2013.01)

(58) Field of Classification Search
CPC .................................................. G06F 3/03545
USPC ................................................ 345/156–184
See application file for complete search history.

(56) References Cited

U.S. PATENT DOCUMENTS

| 2003/0063943 | A1* | 4/2003 | Lapstun et al. | 401/45 |
| 2005/0253806 | A1* | 11/2005 | Liberty | G06F 1/3215 345/156 |
| 2011/0130096 | A1* | 6/2011 | Dunkars | G06F 3/0317 455/41.2 |

* cited by examiner

*Primary Examiner* — Carolyn R Edwards
(74) *Attorney, Agent, or Firm* — Haynes and Boone, LLP

(57) ABSTRACT

An information handling system (IHS) input system includes an IHS having an IHS processor and an IHS display screen coupled to the IHS processor. A pen is configurable to provide an input to the IHS. The pen includes a power supply system, a pen tip, a pen processor coupled to the pen tip, a pen memory that includes instructions that, when executed by the pen processor, causes the pen processor to provide a wake engine, and a motion activated device that is coupled between the power supply system and the pen processor. The motion activated device is configured, in response to movement of the pen, to couple the power supply system to the pen processor such that the wake engine activates the pen tip to configure the pen tip to provide inputs to the IHS processor through the IHS display screen.

20 Claims, 11 Drawing Sheets

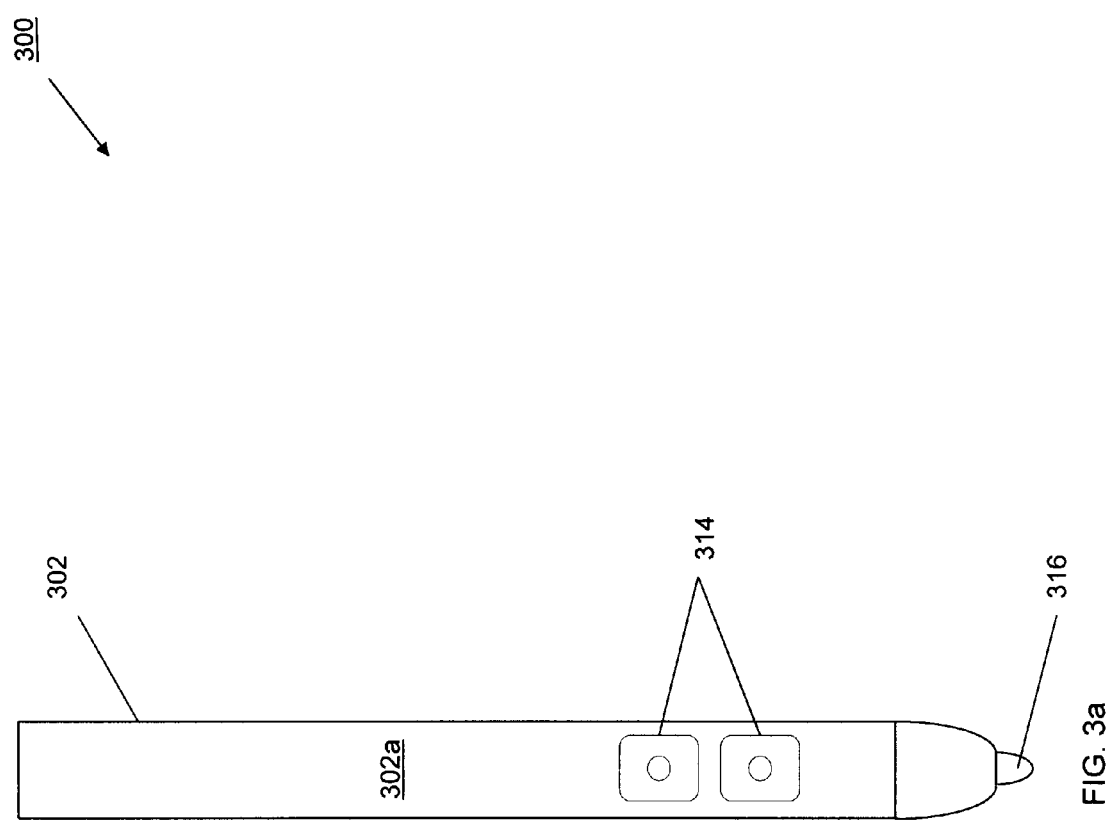

ACTIVE PEN SYSTEM

BACKGROUND

The present disclosure relates generally to information handling systems, and more particularly to an active pen system for use with an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, tablet IHSs, phone IHSs, and/or a variety of other IHSs known in the art, include an active pen that allows a user to provide inputs to the IHS by, for example, enabling direct digital "ink" input via the active pen's engagement with a display screen on the IHS to provide the user with a "pen-on-paper" experience with the IHS. Conventional active pens attempt to conserve a power supply of the active pen by deactivating the active pen during periods of non-use (e.g., putting the pen to "sleep") and only activating the active pen upon initial contact between the active pen and the display screen on the IHS (e.g., via a pressure sensor connected to the pen tip). However, such conventional power conservation methods result in users experiencing an initial delay in display screen response to active pen inputs after a period of non-use of the active pen, as the display screen will not detect and respond to the active pen until that pen is activated by contacting the display screen, and the contact-based activation of the active pen, detection of the active pen by the display screen, and response by the display screen to the active pen takes a significant enough time that the delay is noticeable to the user.

Accordingly, it would be desirable to provide an improved active pen system.

SUMMARY

According to one embodiment, an information handling system (IHS) input system includes an IHS having an IHS processor and an IHS display screen coupled to the IHS processor; a pen that is configurable to provide an input to the IHS, the pen including: a power supply system; a pen tip; a pen processor coupled to the pen tip; a pen memory that includes instructions that, when executed by the pen processor, causes the pen processor to provide a wake engine; and a motion activated device that is coupled between the power supply system and the pen processor, wherein the motion activated device is configured, in response to movement of the pen, to couple the power supply system to the pen processor such that the wake engine activates the pen tip to configure the pen tip to provide inputs to the IHS processor through the IHS display screen.

BRIEF DESCRIPTION OF THE DRAWINGS

FIG. 3a is a front view illustrating an embodiment of an active pen.

FIG. 3b is a schematic view illustrating an embodiment of the active pen of FIG. 3a.

FIG. 6c is a perspective view illustrating a user moving the active pen in the active pen system of FIG. 6a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
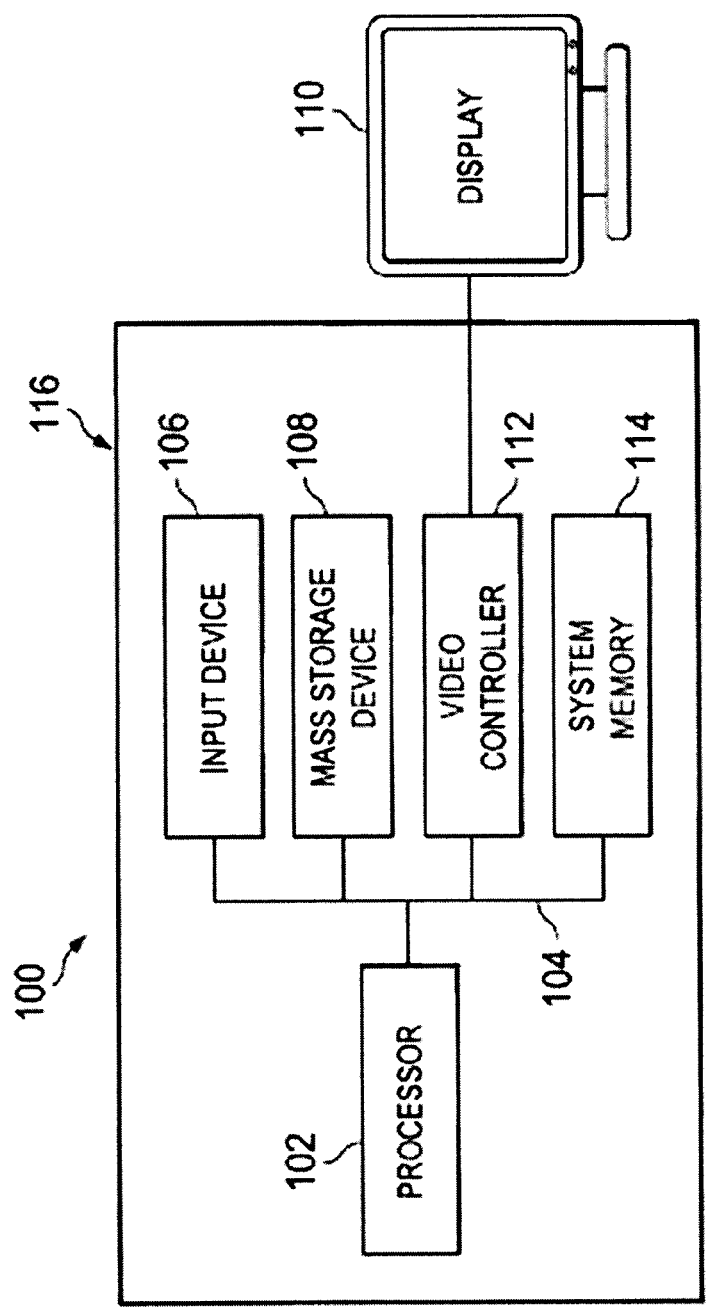
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

The systems and methods discussed below are directed to active pens systems including an active pen and a touch input IHS. There are a wide variety of active pen systems that will fall within the scope of the present disclosure. For example, a first type of active pen system includes active pens such as those available from N-Trig of Kfar Saba, Israel or Synaptics of Santa Clara, Calif., and involve the active pen directly communicating pen XY location, pen tip pressure information, and input button actuation from the active pen to the touch controller chip in the IHS such that the IHS may implement an algorithm to detect when the active pen is present. In another example, a second type of active pen system includes active pens such as those available from Atmel Corporation of San Jose, Calif., and involve the IHS determining the location of the pen tip in the same manner that is used for determining the position of a finger, with pen tip pressure information and input button actuation conveyed similarly to the first type of active pens discussed above. In another example, a third type of active pen system involve the IHS determining the location of the pen tip in the same manner that is used for determining the position of a finger, with pen tip pressure information and input button actuation conveyed using sideband communications methods such as a Bluetooth connection between the active pen and the IHS. In another example, a fourth type of active pen system includes active pens such as those used with active whiteboards or touch sensitive televisions available from LG Corporation of Seoul, South Korea, and involve the IHS determining the location of the pen tip optically using an invisible dot pattern on the IHS display and an optical sensor on the active pen, with pen tip pressure information and input button actuation conveyed using sideband communications methods such as a Bluetooth connection between the active pen and the IHS. In another example, a fourth type of active pen system includes active pens that emit an ultrasonic acoustic signal that is detected by an array of microphones on the IHS, which resolves the XY position of the active pen based on the phase relationship of the acoustic signal detected at each microphone. While a few examples have been provided, one of skill in the art will recognize how the teachings of the present disclosure may benefit a variety of other active pen systems and thus will fall within its scope.

Furthermore, the IHS may include a capacitive-based touch display that detects finger touch position by using a grid of X and Y sensor lines wired into a touch sensor chip. The touch sensor chip can transmit signal on one sensor line while listening for that signal on other sensor lines. The finger provides coupling to adjacent or perpendicular receiver sensor lines and may use various proprietary scanning algorithms to resolve XY finger position relative to the touch display. Some capacitive-based touch displays also have the ability to detect signals transmitted from an active pen (e.g., the first type of active pen discussed above). When the active pen is detected and the touch sensor chip switches to active pen mode, some or all of the sensor lines may be set to a listen mode such that the position of the active pens tip can be very accurately resolved. In some cases, signals including other data may be communicated from the active pen to the touch sensor chip through the sensor lines as well to convey information about the applied force on the active pen tip and to convey when buttons on the active pen are pressed. The active pen requires energy to transmit these signals and to measure contact force at the active pen tip, and the available energy is limited by the small battery that can fit into a relatively small active pen. As such it is important to activate the active pen only when it is in use to conserve power. When active pens do not transmit a signal that is used to resolve their location on the grid (e.g., the second type of active pen discussed above), the pen tip location may be resolved as though it were a passive pen, but additional information such as button press events and pen tip pressure conveyed by a signal transmitted from the pen.

Figure 2:
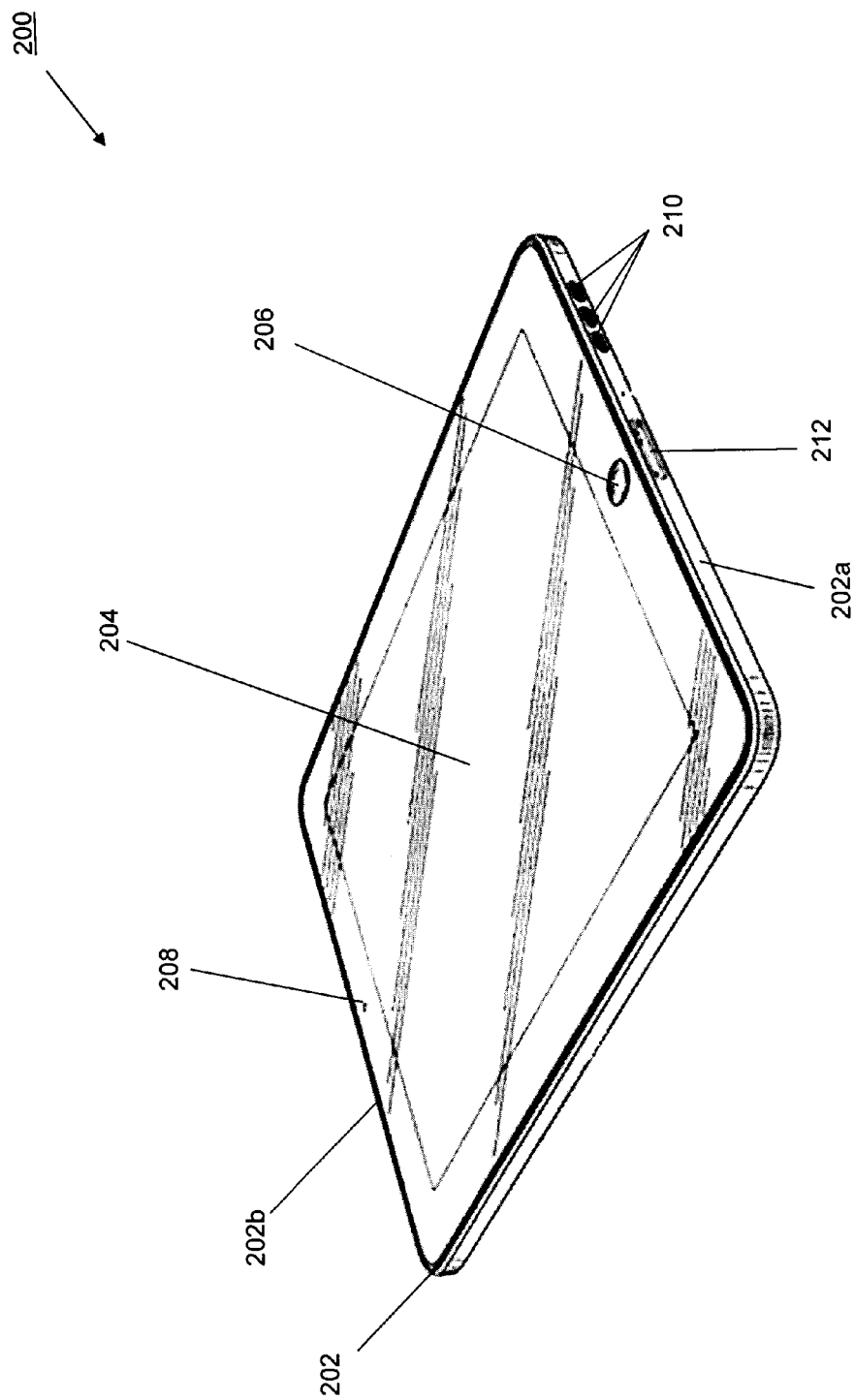
FIG. 2 is a perspective view illustrating an embodiment of an information handling system.

Referring now to FIG. 2, an embodiment of an IHS 200 is illustrated. The IHS 200 may be the IHS 100, discussed above with reference to FIG. 1, and/or may include some or all of the components of the IHS 100. In the illustrated embodiment, the IHS 200 is a tablet IHS that is configured (e.g., via hardware and/or software) to operate with the active pens of the present disclosure. However, one of skill in the art in possession of the present disclosure will recognize that a wide variety of IHSs (e.g., phone IHSs, laptop or notebook IHSs, desktop IHSs, etc.) that utilize active pens will benefit from the teachings of the present disclosure and thus will fall within its scope. Furthermore, in some embodiments, the IHS 200 may include active pen interaction components that are configured to interact with the active pens discussed below, while in other embodiments, the IHS 200 may not need any specialized components to interact with the active pens discussed below (i.e., the components in the IHS 200 used to provide conventional touch screen functionality with a user's fingers may be operable to interact with the active pens discussed below without the need for any other specialized active pen interaction components). The IHS 200 includes an IHS chassis 202 that houses the IHS components (e.g., a processing system, memory system, storage system, etc.) including an IHS display screen 204 that is partially housed in the IHS chassis 202 and provides an input surface of the IHS 200 via a touch sensitive display (e.g., using capacitive touch detecting systems, other touch detecting systems discussed above, and/or a variety of other touch detecting systems known in the art. At least one input button 206 is located on the IHS chassis 202 between the IHS display screen 204 and a bottom edge 202a of the IHS chassis 202. A camera 208 is located on the IHS chassis 202 between the IHS display screen 204 and a top edge 202b of the IHS chassis 202. A speaker/microphone system 210 is located on the bottom edge 202a of the IHS chassis 202, and a data connector 212 is located on the bottom edge 202a of the IHS chassis 202 adjacent the speaker/microphone system 210. One of skill in the art will recognize that the IHS 200 (or other IHSs used with the active pens discussed below) may include a variety of other components and features, and/or have the illustrated components and features arranged differently, while remaining with the scope of the present disclosure.

Figure 3B:
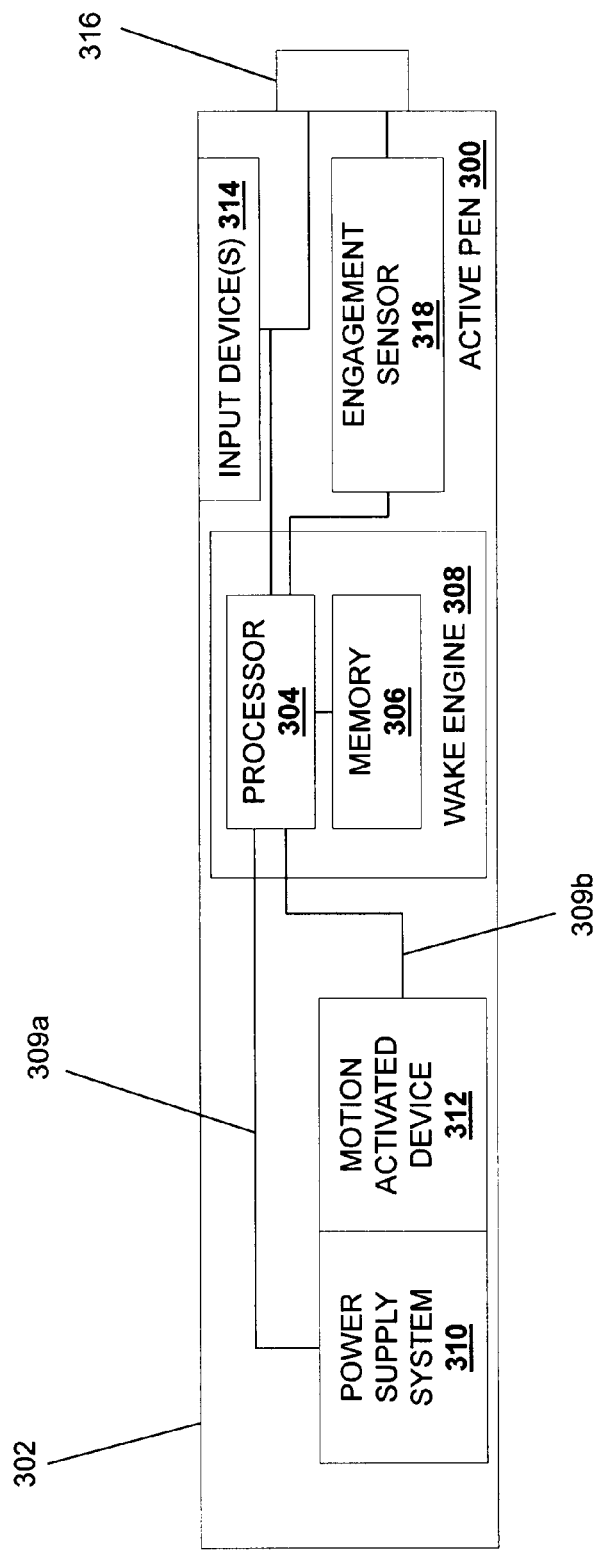

Referring now to FIGS. 3a and 3b, and embodiment of an active pen 300 is illustrated. In different embodiments, the active pen 300 may be a capacitive active pen, other active pens discussed above, and/or a variety of other active pen types that send signals to display screens that, for example, may be used by the display screens to locate the active pen spatially relative to the display screens. The active pen 300 includes a pen chassis 302 that houses a processing system 304 and a memory system 306. The memory system 306 is coupled to the processing system 304 and includes instructions that, when executed by the processing system 304, cause the processing system 304 to provide a wake engine 308 that includes the activation/deactivation functionality of the wake engines and wake systems, as well as any other functionality, discussed below.

The pen chassis 302 also houses a power supply system 310 that may be configured to couple to a battery (e.g., rechargeable or non-rechargeable), that includes an integrated rechargeable battery that may be recharged in the pen chassis 302 using methods known in the art, and/or that includes or may include other power supplies known in the art. In some embodiments, the IHS 200 discussed above with reference to FIG. 2 may be configured to store the pen chassis 302 and, in some cases, recharge a rechargeable battery included in the power supply system 310. In other embodiments, the power supply system 310 may be configured to accept a replaceable, non-rechargeable battery. The power supply system 310 is directly coupled to the wake engine 308 through a direct coupling 309a to the processing system 304, as well as indirectly coupled to the wake engine 308 through a motion activated device 312 and an indirect coupling 309b that couples the power supply system 310 to the processing system 304. In an embodiment, the motion activated device 312 may include acceleration sensors and/or a variety of other motion detecting sensors known in the art. The pen chassis 302 may include inputs devices 314 that are accessible on the outer surface 302a of the pen chassis 302 and that are coupled to the processing system 304. The pen chassis 302 also includes a pen tip 316 that is coupled to the processing system 304 and, while not described in detail below, the processing system 304 may be configured to operate with other components in the pen chassis 302 (illustrated or not illustrated) to send signals through the pen tip 316 to a display screen. The pen tip 316 may also be coupled to an engagement sensor 314 that is coupled to the processing system 304 and that may include a pressure sensing device, a capacitive sensing device, force sensors incorporating a force sensing resistor, displacement sensors combined with springs to facilitate indirect measurements of force such as linear variable transformers, optical encoders, or switches that close at a threshold force, and or a variety of other devices that are operable to detect an engagement of the pen tip 316 with a display screen, discussed in further detail below.

Figure 4:
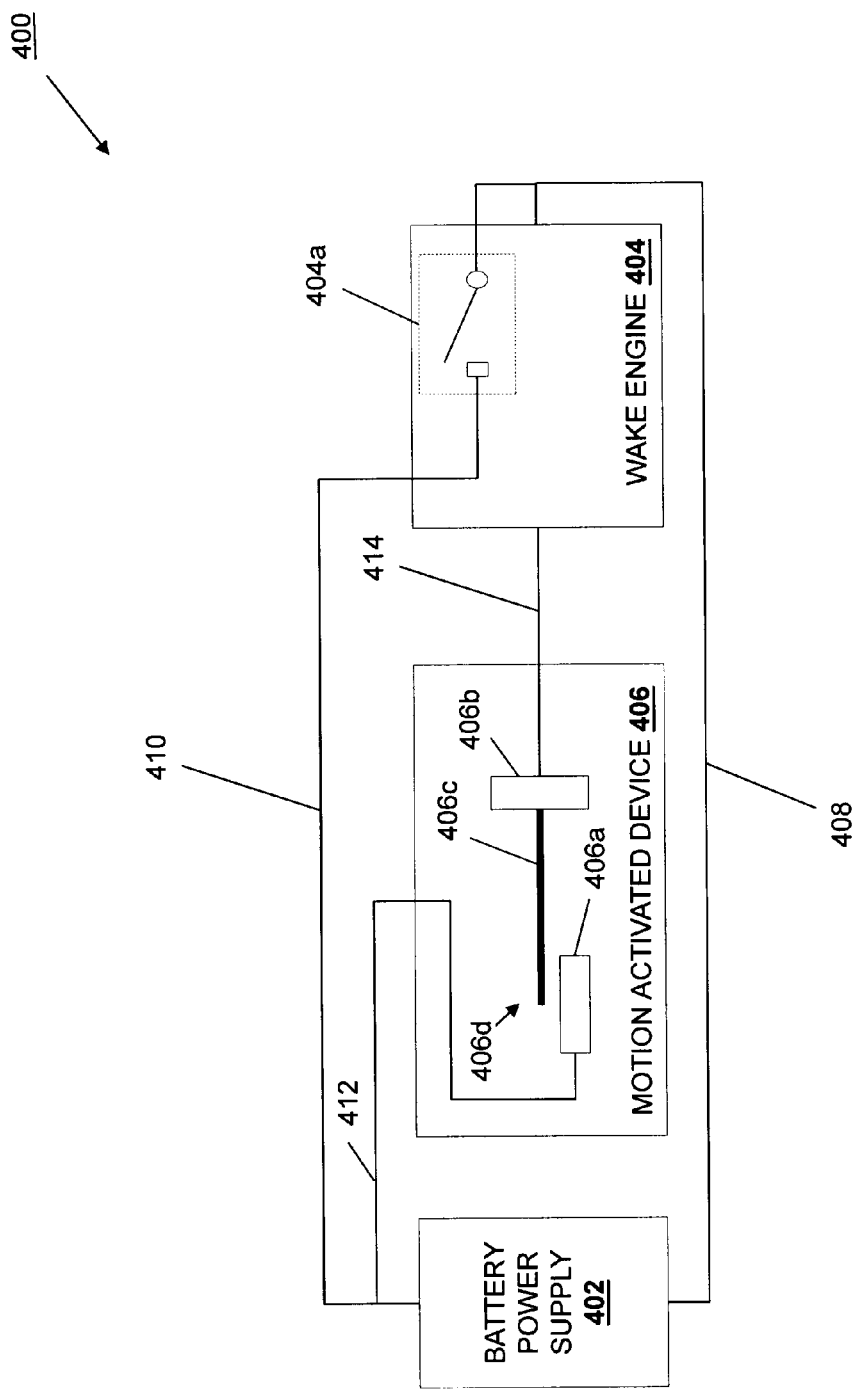
FIG. 4 is a schematic view illustrating an embodiment of a wake system in the active pen of FIGS. 3a and 3b.

Referring now to FIG. 4, an embodiment of a wake system 400 is illustrated. The embodiment of the wake system 400 illustrated in FIG. 4 has been provided for clarity of discussion and illustration, and thus includes only some of the components of the active pen 300 discussed above with reference to FIGS. 3a and 3b. However, it should be understood that the wake system 400 may be utilized in the active pen 300 and may interact with other components in the pen chassis 302. The wake system 400 includes a battery power supply 402 which, for example, may be a battery included in and/or coupled to the power supply system 310 discussed above with reference to FIG. 3b. The battery power supply 402 is directly coupled to a wake engine 304 which, for example, may be the wake engine 308 provided by the processor 304 and memory 306 discussed above with reference to FIG. 3b. In the illustrated embodiment, the wake engine 404 includes a wake engine power component 404a that, while not described in detail herein, may include a wide variety of circuitry known in the art. In the illustrated embodiment, the direct coupling between the battery power supply 402 and the wake engine 304 includes a first connection 408 between the battery power supply 402 (e.g., from a negative terminal of the battery power supply 402) and the wake engine 404 (e.g., to the wake engine power component 404a), and a second connection 410 between the battery power supply 402 (e.g., from a positive terminal of the battery power supply 402) and the wake engine 404 (e.g., to the wake engine power component 404a). The battery power supply 402 is also indirectly coupled to the wake engine 304 by a motion activated device 304 which, for example, may be the motion activated device 312 discussed above with reference to FIG. 3b and which is coupled between the battery power supply 402 and the wake engine 304. In the illustrated embodiment, that indirect coupling includes the first connection 408 between the battery power supply 402 and the wake engine 404, a third connection 412 between the battery power supply 402 (e.g., from a positive terminal of the battery power supply 402) and the motion activated device 406, and a fourth connection 414 between the motion activated device 406 and the wake engine 404.

In the illustrated embodiment, the motion activated device 406 is a micro-electromechanical system (MEMS) cantilever device that may be created using MEMS technology and methods known in the art. The motion activated device 406 includes a first contact 406a that is connected to the third connection 412 to the battery power supply 402, and a second contact 406b that is connected to the fourth connection 414 between the motion activated device 406 and the wake engine 404. A MEMS cantilever beam 406c extends from the second contact 406b and includes a distal portion 406d that is located adjacent the first contact 406a. While a specific embodiment of the motion activated device 406 has been illustrated and described, on one of skill in the art in possession of the present disclosure will recognize that other motion activated devices such as, for example, magnetic motion activated switches (e.g., where the MEMS cantilever beam 406c is replaced by a magnetic member that is offset a distance from the first contact 406a such that motion induced force is operable to close that distance to allow the magnetic forces to engage the magnetic member and first contact 406a), piezo-resistive switches, devices similar in operation to mercury tilt switches, and/or a variety of other motion activated devices will fall within its scope. Furthermore, while the motion activated device 406 of the illustrated embodiments operates by completing a power circuit between the battery power supply 402 and the wake engine 404, discussed in further details below, other embodiments of motion activated devices may operate by opening a circuit such that power is provided to the wake engine 404.

Figure 5:
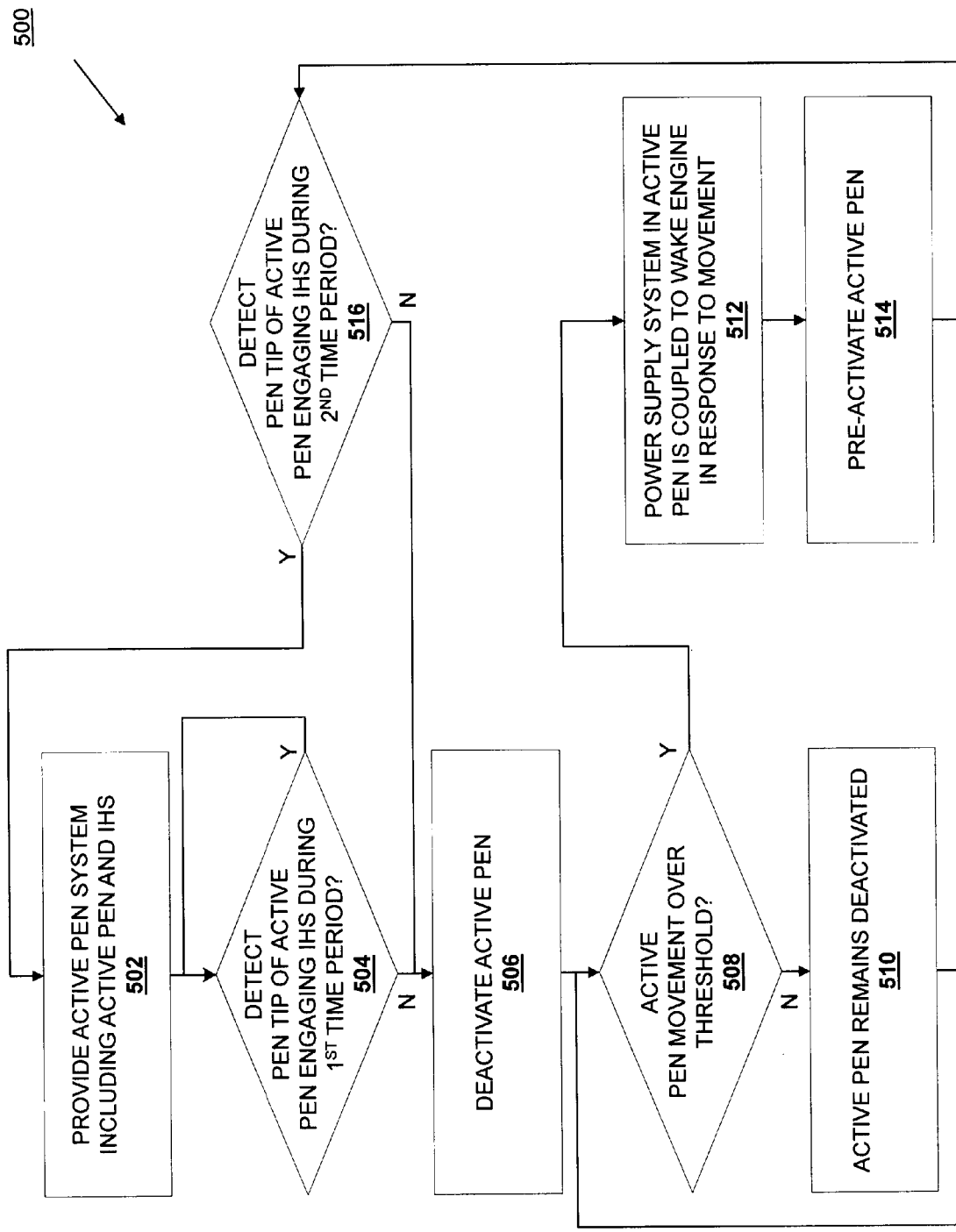
FIG. 5 is a flow chart illustrating an embodiment of a method for providing input to an IHS.
Figure 6A:
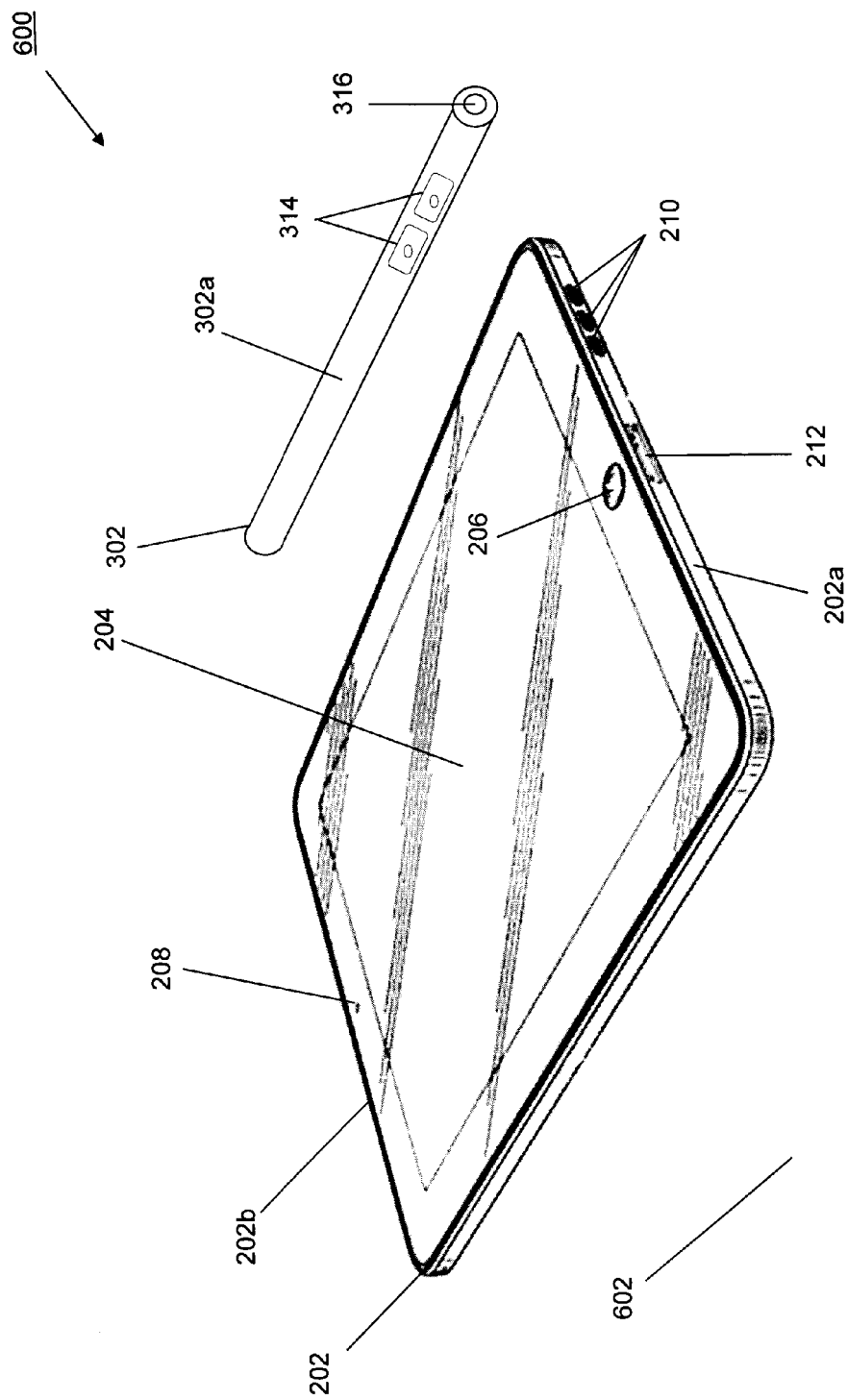
FIG. 6a is a perspective view illustrating an active pen system including the IHS of FIG. 2 and the active pen of FIGS. 3a and 3b.

Referring now to FIG. 5, an embodiment of a method 500 for providing input to an IHS is illustrated. The method 500 is discussed below as substantially beginning with an activated active pen 300 and the detection of whether the pen tip 316 of the activated active pen 300 has engaged the IHS within a time period (e.g., during or immediately following a use of the active pen 300), one of skill in the art will recognize that the method 500 may begin with the active pen 300 deactivated at block 510 or being activated at block 506 while remaining within the scope of the present disclosure. The method 500 begins at block 502 where an active pen system including an active pen and an IHS is provided. Referring to FIG. 6a, an embodiment of an active pen system 600 is illustrated that includes the IHS 200, discussed above with reference to FIG. 2, and the active pen 300, discussed above with reference to FIGS. 3a and 3b. In the embodiment illustrated in FIG. 6a, the IHS 200 and the active pen 300 are located on one or more surfaces 602. In the illustrated example, a user may have been using the active pen 300 with the IHS 200, and then set the active pen 300 on the surface 602 such that the active pen 300 remains immobile on the surface 602. In another example, a user may be using the active pen 300 with the IHS 200, and then disengage the active pen 300 and the IHS 200 while still holding the active pen 300. While a few examples have been provided, one of skill in the art in possession of the present disclosure will recognize that a wide variety of scenarios may lead to method block 504, discussed below.

Figure 6B:
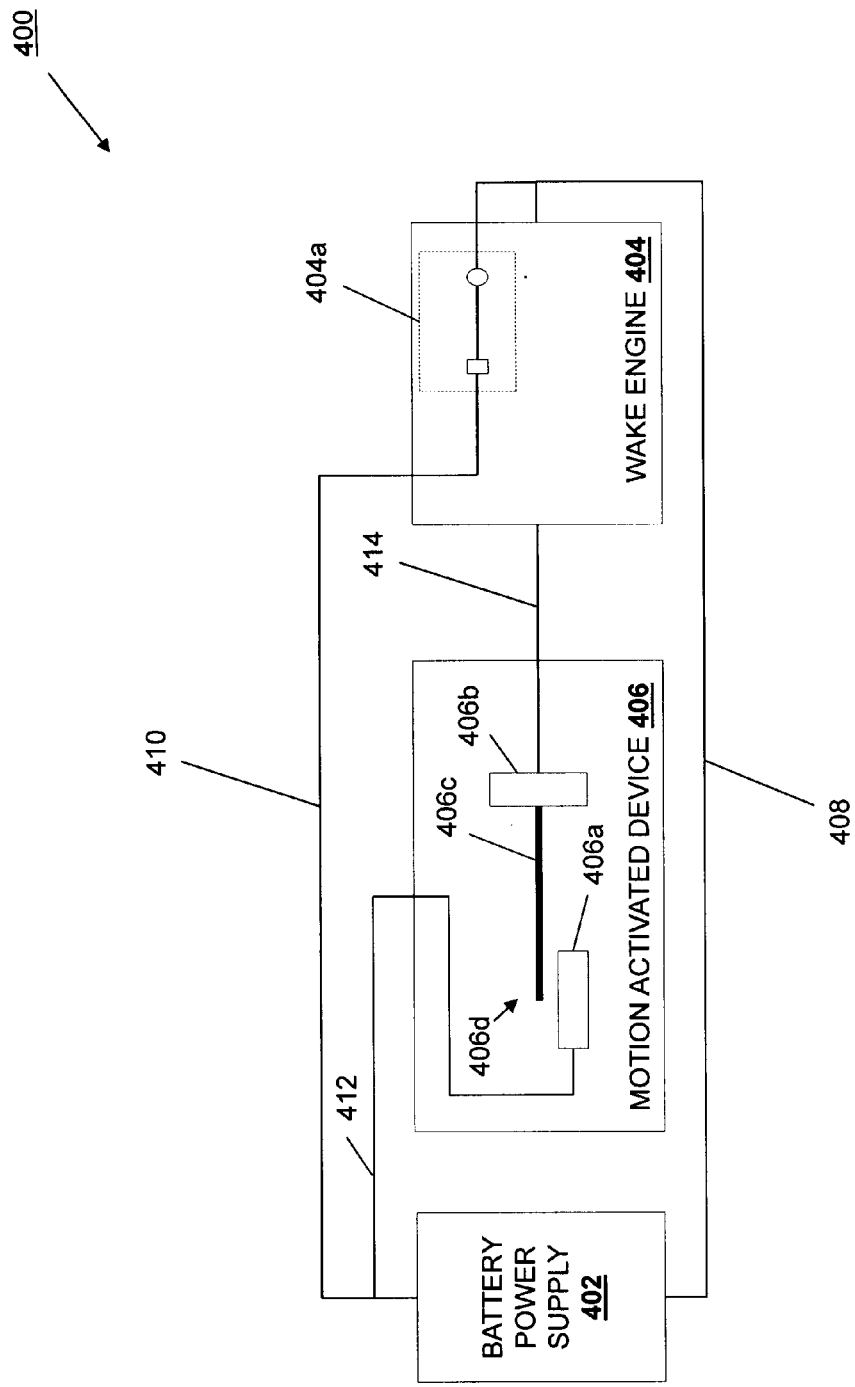
FIG. 6b is a perspective view illustrating the wake system of FIG. 4 configuring the active pen of FIGS. 3a and 3b in an activated state.

The method 500 then proceeds to decision block 504 where it is determined whether the pen tip of the active pen has been detected engaging the IHS during a first or "activated" time period. As discussed above, the active pen 300 may have been activated prior to decision block 504 such that, referring to wake system in FIG. 6b, the wake engine power component 404a connects the processing system (e.g., the processing system 304 of FIG. 3b) in the wake engine 404 to the battery power supply 402 through the first connection 408 and the second connection 410 (indicated by the closed switch in the wake engine power component 404a). With the processing system in the wake engine 404 connected to the battery power supply 402 through the first connection 408 and the second connection 410, that processing system may operate (e.g., with instruction stored on a memory system such as the memory system 306 of FIG. 3b) to provides signals to the pen tip 316 for use in providing inputs to the IHS 200.

At decision block 504, the wake engine 308/404 operates to detect whether the pen tip 316 of the active pen 300 has engaged the IHS display screen 204 of the IHS 200 during an activated time period. In an embodiment, the activated time period may be predetermined or otherwise selected to ensure that the active pen 300 is not deactivated during normal breaks or in use of the active pen 300 (e.g., disengagement between the pen tip 316 and the IHS display screen 204). For example, the activated time period may be approximately 60 seconds, and may be reset following each detected engagement of the pen tip 316 and the IHS display screen 204. In an embodiment, "engagement" of the pen tip 316 and the IHS display screen 204 may be detected by the engagement sensor 318 and may include direct physical contact between the pen tip 316 and the IHS display screen 204 (e.g., detected by pressure engagement sensor), electrical communication between the pen tip 316 and the IHS display screen 204 resulting from the positioning the pen tip 316 within a minimum distance from the IHS display screen 204 (e.g., detected by an capacitive engagement sensor), and/or a variety of other engagement scenarios known in the art. Thus, at decision block 504, the wake engine 308 may monitor the engagement sensor 318 to determine whether engagement of the pen tip 316 and the IHS display screen 204 is detected (or not detected) for 60 seconds (or any other activated time period).

If, at decision block 504, the pen tip 316 of the active pen 300 is detected engaging the IHS display screen 204 during the activated time period, the method 500 returns to decision block 504 to continue determining whether the pen tip of the active pen has been detected engaging the IHS during the time period. If, at decision block 504, the pen tip 316 of the active pen 300 is not detected engaging the IHS display screen 204 during the activated time period, the method 500 proceeds to block 506 where the active pen is deactivated. In an embodiment of block 506, the wake engine 404 deactivates the active pen 300 by using the wake engine power component 404a to disconnect the processing system (e.g., the processing system 304 of FIG. 3b) in the wake engine 404 from the battery power supply 402 through the first connection 408 and the second connection 410 (indicated by the open switch in the wake engine power component 404a illustrated in FIG. 4). In the deactivated embodiment illustrated in FIG. 4, the battery power supply 402 is disconnected from the wake engine 404 and the other power consuming components of active pen 300, and thus little to no power is drawn from the battery power supply 402 by the components of the active pen 300 and the battery power supply 402 loses little to no power.

The method 500 then proceeds to decision block 508 where it is determined whether the active pen has experienced movement that is over a threshold. Referring back to FIG. 4, the motion activated device 406 is illustrated in an embodiment where the active pen 300 is not experiencing movement, or is not experiencing movement over a threshold. Specifically, FIG. 4 illustrates the distal portion 406d of the MEMS cantilever beam 406c not engaging the first contact 406a. In the embodiment illustrated in FIG. 4, it is "determined" at decision block 508 that the active pen 300 has not experience movement over the threshold, and the method 500 will proceed to block 510 where the active pen remains deactivated. In an embodiment, the deactivated active pen 300 remains as discussed following the deactivation of the active pen in block 506. Following block 510, the method 500 continues to loop through decision block 508 and block 510 as long as the active pen 300 does not experience movement over the threshold.

In an embodiment, the structural details of the MEMS cantilever beam 406c may be selected in order to determine the threshold used at decision block 508. As discussed above, the MEMS cantilever beam 406c may be considered an acceleration sensor, and the dimensions of the MEMS cantilever beam 406c (e.g., length, width, height, etc.), the material used for the MEMS cantilever beam 406c (e.g., selected for material stiffness or other deflection characteristics), the distance between the distal portion 406d of the MEMS cantilever beam 406c and the first contact 406a, and/or a number of other details of the motion activated device 406 may be selected in order to determine an acceleration that will produce a force that causes the distal portion 406d of the MEMS cantilever beam 406c to deflect and engage the first contact 406a, discussed in further detail below. As such, a predetermined acceleration threshold may be associated with the motion activated device 406 such that movement of the active pen 300 that produces an acceleration that exceeds that predetermined acceleration threshold causes the activation of the active pen 300, discussed in further detail below. As discussed below, such a predetermined acceleration threshold may be selected to distinguish inadvertent movements of the active pen 300 from movements of the active pen 300 that are initiated by a user with the intention of using the active pen 300 to provide input to the IHS 200. In a specific example, the MEMS cantilever beam 406c may be provided such that sufficient engagement of the distal portion 406d with the first contact 406a occurs, discussed in further detail below, in response to an acceleration that produces a 50 gram force on the distal portion 406d of the MEMS cantilever beam 406c.

In another embodiment, the motion activated device 406 may include components that allow acceleration of the active pen 300 in different axes to be detected (e.g., using a multi-axis MEMS threshold accelerometer switch), and at decision block 508 it may be determined whether movement of the active pen 300 in a particular one of those axes exceeds a threshold. One of skill in the art in possession of the present disclosure will understand how the components in the motion activated device 406 may be configured such that an acceleration of the active pen 300 both over a predetermined acceleration threshold and in a predetermined axis is determined at decision block 508. Such embodiments may be employed to ensure that random movements such a vibrations do not activate the active pen 300, and only particular movements (e.g., a user picking up the active pen 300) operate to activate the active pen 300.

Figure 6C:
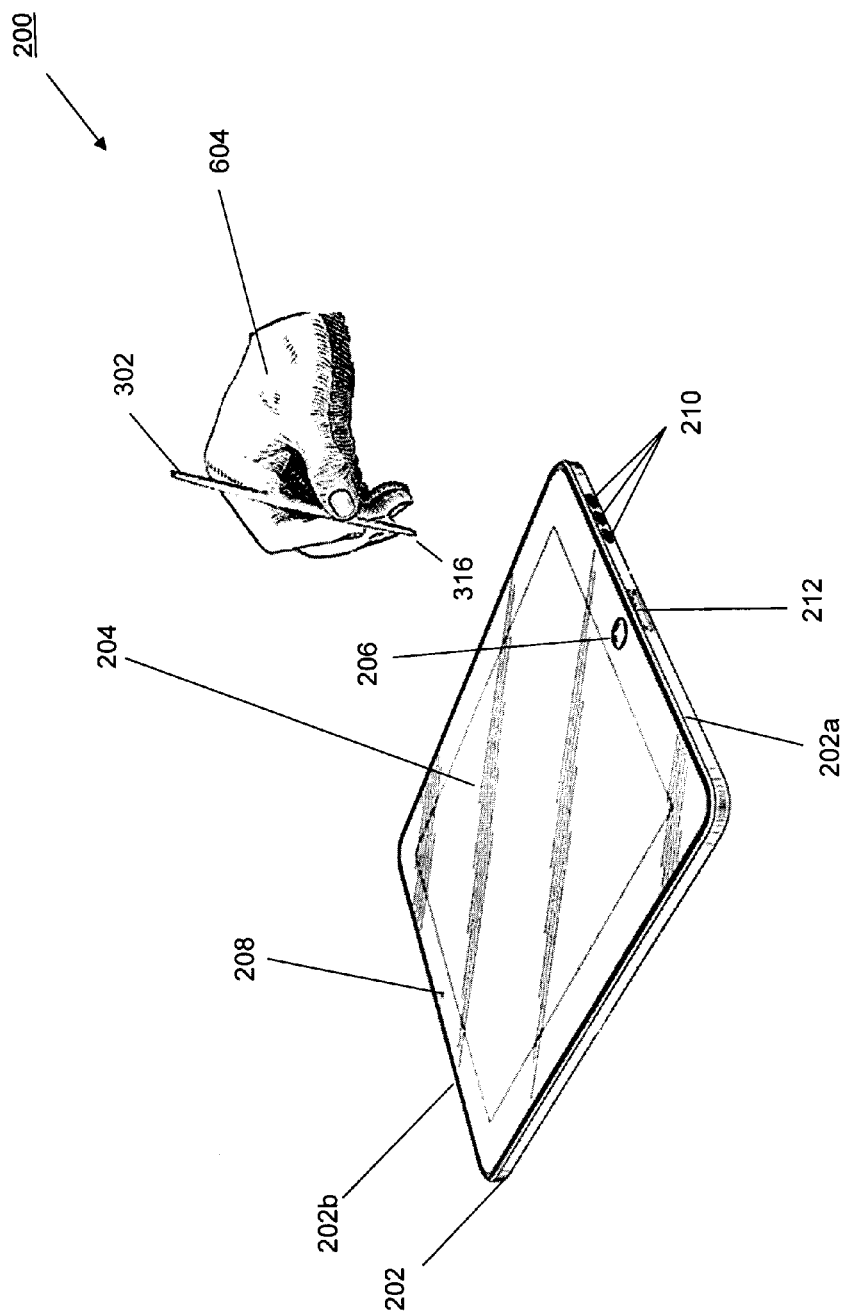
Figure 6D:
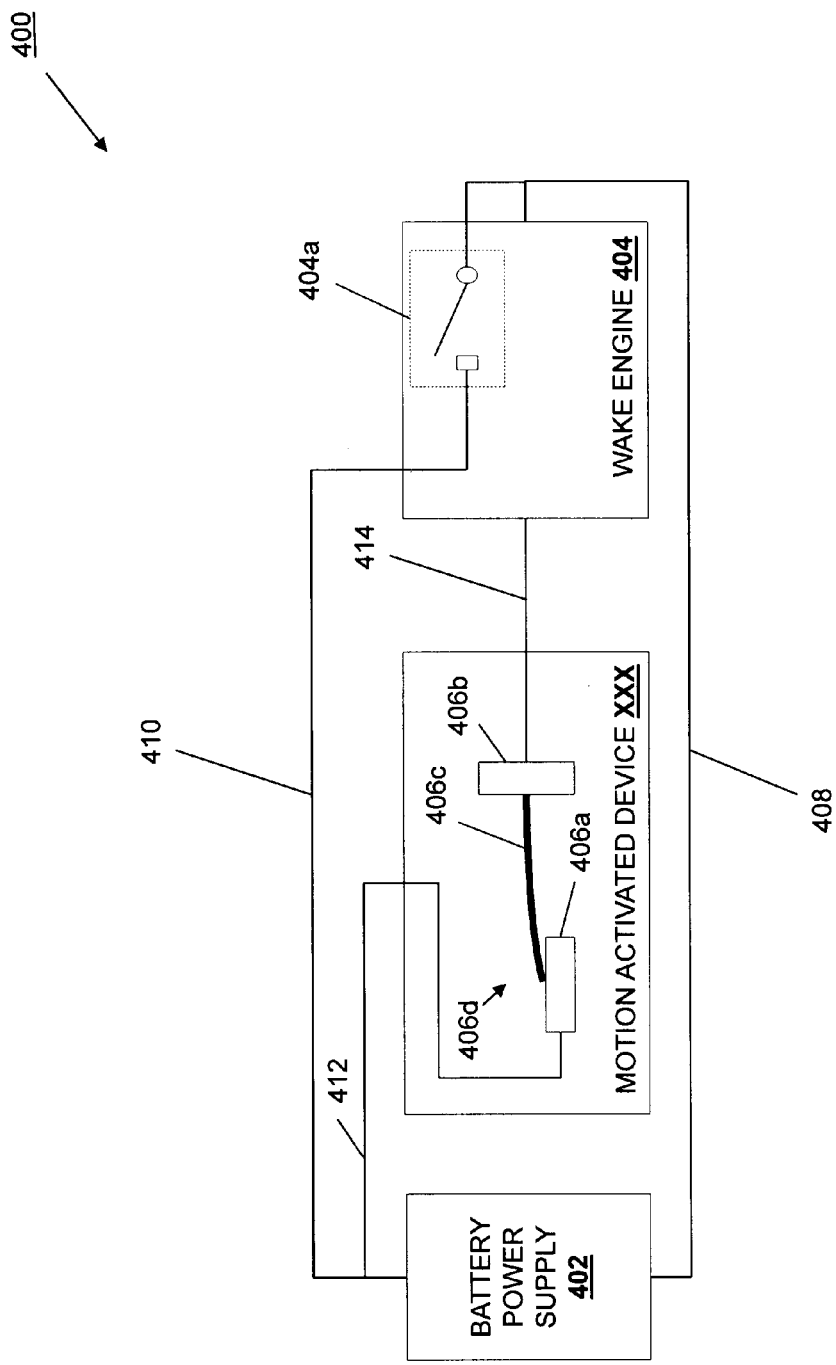
FIG. 6d is a schematic view illustrating an embodiment of the operation of the wake system of FIG. 4.

If at decision block 508 it is determined that the movement of the active pen 300 exceeds the threshold, the method 500 proceeds to block 512 where the power supply system in the active pen is coupled to the wake engine in response to that movement. Referring now to FIGS. 6c and 6d, an embodiment of the movement of the active pen 300 is illustrated. FIG. 6c illustrates a user 604 (e.g., a user's hand) having picked up the active pen 300 for use with the IHS 200. FIG. 6d illustrates how, in response to the movement of the active pen 300 (as a result of the user 604 picking up the active pen 300), the force from the acceleration that results from the movement of the active pen 300 causes the distal portion 406d of the MEMS cantilever beam 406c to deflect and engage the first contact 406a. Engagement of the MEMS cantilever beam 406c and the first contact 406a couples the battery power supply 402 to the wake engine 404 (e.g., the processing system 304 in the wake engine 308) through the first connection 408 between the battery power supply 402 and the wake engine 404, and the combination of the third connection 412, the motion activated device 406 (during the engagement of the MEMS cantilever beam 406c and the first contact 406a), and the fourth connection 414 to the wake engine 404.

The method 500 then proceeds to block 514 where the active pen is pre-activated. In response to the coupling of the battery power supply 402 to the wake engine 404 at block 512, the wake engine 404 is now powered such that the wake engine power component 404a may be actuated to connect the processing system (e.g., the processing system 304 of FIG. 3b) in the wake engine 404 to the battery power supply 402 through the first connection 408 and the second connection 410 (indicated by the closed switch in the wake engine power component 404a, illustrated in FIG. 6b). In response to pre-activating the active pen 300 at block 514 by connecting the processing system to the battery power supply 402 through the first connection 408 and the second connection 410, the processing system operates to provide signals to the pen tip 316 for use with the IHS 200 substantially as described above when the active pen 300 is activated, but for a shorter amount of time, as discussed below. Similarly as discussed above, the dimensions of the MEMS cantilever beam 406c (e.g., length, width, height, etc.), the material used for the MEMS cantilever beam 406c, the distance between the distal portion 406d of the MEMS cantilever beam 406c and the first contact 406a, and/or a number of other details of the motion activated device 406 may be selected in order to ensure that the acceleration that exceeds the predetermined acceleration threshold and produces a deflection of the MEMS cantilever beam 406c into engagement with the first contact 406d is sufficient (e.g., in duration, contact area, etc.) to provide enough power between the battery power supply 402 and the wake engine 404 to actuate the wake engine power component 404a.

The method 500 then proceeds to decision block 516 where it is determined whether the pen tip of the active pen has been detected engaging the IHS during a second or "pre-activated" time period. As discussed above, the active pen 300 may have been pre-activated by actuating the wake engine power component 404a to connect the processing system (e.g., the processing system 304 of FIG. 3b) in the wake engine 404 to the battery power supply 402 through the first connection 408 and the second connection 410 (indicated by the closed switch in the wake engine power component 404a). At decision block 516, the wake engine 308/404 operates to detect whether the pen tip 316 of the active pen 300 has engaged the IHS display screen 204 of the IHS 200 during a pre-activated time period that may be shorter than the activated time period (discussed above with reference to decision block 504). In an embodiment, the pre-activated time period may be predetermined or otherwise selected to ensure that the active pen 300 is only activated long enough to determine whether the user 604 is going use of the active pen 300. For example, the pre-activated time period may be approximately 10 seconds.

Figure 6E:
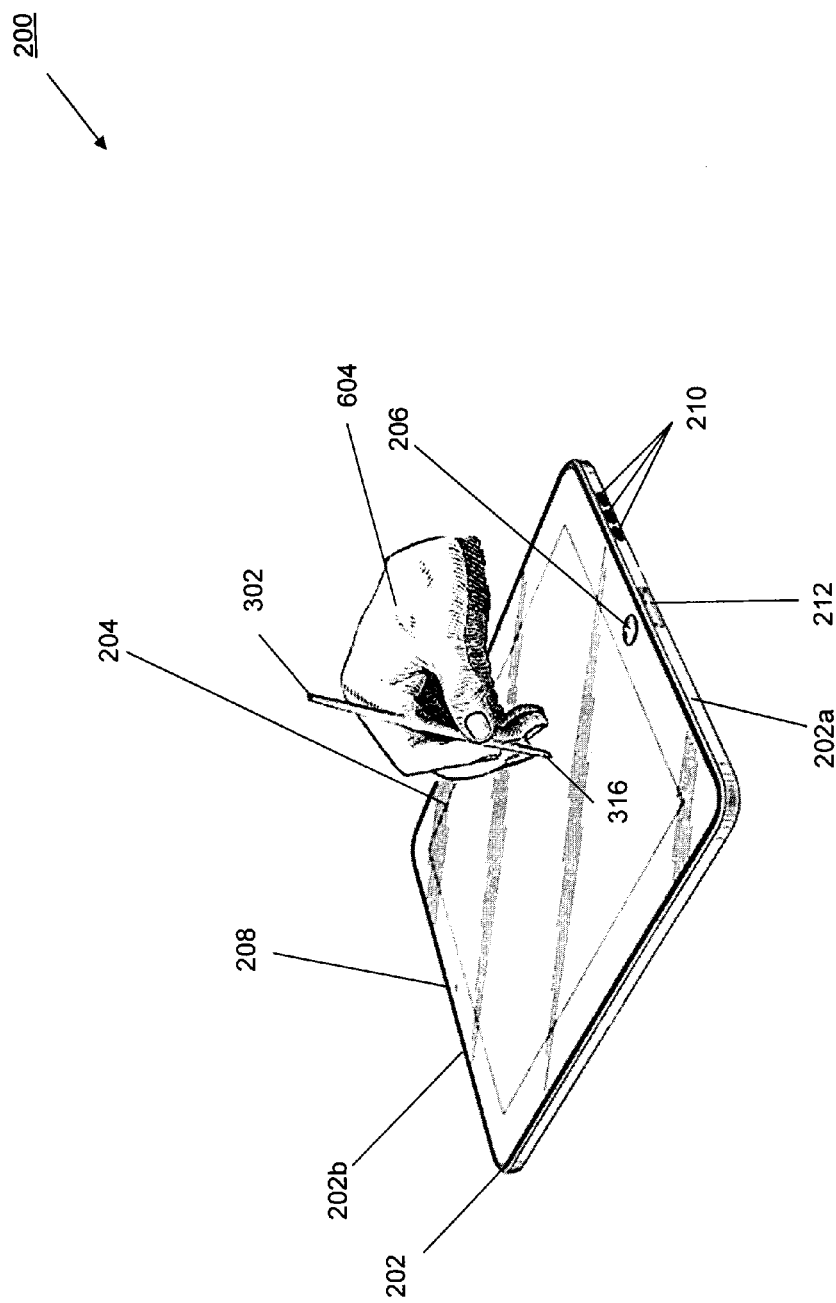
FIG. 6e is a perspective view illustrating engagement of the active pen of FIGS. 3a and 3b with the IHS of FIG. 2.

If, at decision block 516, the pen tip 316 of the active pen 300 is detected engaging the IHS display screen 204 during the pre-activated time period, the method 500 returns to the portion of block 502 where the active pen 300 is activated and may be used to provide inputs to the IHS display screen 204 (e.g., with the processing system operating to provide signals to the pen tip 316 for use with the IHS 200). However, because the active pen 300 was pre-activated at block 514, the engagement of the pen tip 316 and the IHS display screen 204 detected at decision block 516 is immediately detected and responded to by the IHS display screen 204. This may be contrasted with conventional systems in which that engagement is used to activate the active pen, and results in a delay in the detection and response by the IHS display screen 204. FIG. 6e illustrates the user 604 engaging the pen tip 316 of the pre-activated active pen 300 with the IHS display screen 204 of the IHS 200 (e.g., such that signals from the pen tip 316 are immediately recognized and responded to by the IHS display screen 204). If, at decision block 516, the pen tip 316 of the active pen 300 is not detected engaging the IHS display screen 204 during the pre-activated time period, the method 500 proceeds to block 506 where the active pen is deactivated substantially as discussed above.

Thus, systems and methods have been described that provide for the pre-activation of an active pen as a result of movement of that active pen such that the initial engagement of that active pen with an IHS display screen may be immediately detected and responded to, which solves problems associated with the lag between the initial engagement of conventional active pens with IHS display screens due to those conventional pens being activated as a result of that initial engagement. The systems and methods may utilize relatively cheap and easily incorporated MEMS devices to provide acceleration sensors that, when disturbed by an acceleration that exceeds a predefined acceleration threshold, completes a circuit that provides power to the active pen. This movement based powering of the active pen may be performed for a shorter time period than a time period associated with a pressure based powering of the active pen based on a detected pressure at the pen tip (which may be a more reliable indicator of active pen use) in order to ensure that inadvertent or otherwise non-active-pen-use movements do not drain the power supply of the active pen.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An active pen, comprising:
a pen chassis including a pen tip;
a power supply system housed in the pen chassis;
a memory system that is housed in the pen chassis and that includes instructions that, when executed by a processing system that is housed in the pen chassis and that is coupled to the pen tip, causes the processing system to provide a wake engine that is configured to activate the pen tip for a first predetermined time period in response to the pen tip engaging a display screen; and
a motion activated device that is coupled between the power supply system and the processing system, wherein the motion activated device is configured, in response to detecting a movement of the pen chassis when the pen tip is deactivated such that no power is drawn from the power supply system by the motion activated device, the pen tip, the memory system, and the processing system, to couple the power supply system to the processing system such that the wake engine activates the pen tip for a second predetermined time period that is shorter than the first predetermined time period so that a subsequent engagement of the pen tip and the display screen during the second predetermined time period provides an immediate input to the display screen while also extending the activation of the pen tip from the second predetermined time period to the first predetermined time period.

2. The active pen of claim 1, wherein the motion activated device includes an acceleration sensor.

3. The active pen of claim 2, wherein the wake engine is configured to determine an acceleration resulting from the movement of the pen chassis, and wherein the wake engine activates the pen tip for the second predetermined time period in response to the acceleration resulting from the movement of the pen chassis exceeding a predetermined acceleration threshold.

4. The active pen of claim 2, wherein the wake engine is configured to determine an axis of acceleration resulting from the movement of the pen chassis, and wherein the wake engine activates the pen tip for the second predetermined time period in response to the axis of acceleration resulting from the movement of the pen chassis being a predetermined axis.

5. The active pen of claim 1, wherein the first predetermined time period is approximately 60 seconds.

6. The active pen of claim 5, wherein the second predetermined time period is approximately 10 seconds.

7. The active pen of claim 1, wherein the wake engine is configured to deactivate the pen tip following at least one predetermined time period in which the pen tip is not detected engaging a display screen.

8. An information handling system (IHS) input system, comprising:
an IHS including:
an IHS processor; and
an IHS display screen coupled to the IHS processor;
a pen that is configurable to provide an input to the IHS, the pen including:
a power supply system;
a pen tip;
a pen processor coupled to the pen tip;
a pen memory that includes instructions that, when executed by the pen processor, causes the pen processor to provide a wake engine that is configured to activate the pen tip for a first predetermined time period in response to the pen tip engaging the IHS display screen; and
a motion activated device that is coupled between the power supply system and the pen processor, wherein the motion activated device is configured, in response to detecting a movement of the pen when the pen tip is deactivated such that no power is drawn from the power supply system by the motion activated device, the pen tip, the pen memory system, and the pen processor, to couple the power supply system to the pen processor such that the wake engine activates the pen tip for a second predetermined time period to configure the pen tip to provide inputs to the IHS processor through the IHS display screen, wherein the first predetermined time period is longer than the second predetermined time period so that a subsequent engagement of the pen tip and the display screen during the second predetermined time period provides an immediate input to the display screen while also extending the activation of the pen tip from the second predetermined time period to the first predetermined time period.

9. The IHS input system of claim 8, wherein the motion activated device includes an acceleration sensor.

10. The IHS input system of claim 9, wherein the wake engine is configured to determine an acceleration resulting from the movement of the pen, and wherein the wake engine activates the pen tip for the second predetermined time period in response to the acceleration resulting from the movement of the pen exceeding an predetermined acceleration threshold.

11. The IHS input system of claim 9, wherein the wake engine is configured to determine an axis of acceleration resulting from the movement of the pen, and wherein the wake engine activates the pen tip for the second predetermined time period in response to the axis of acceleration resulting from the movement of the pen being a predetermined axis.

12. The IHS input system of claim 8, wherein the first predetermined time period is approximately 60 seconds.

13. The IHS input system of claim 12, wherein the second predetermined time period is approximately 10 seconds.

14. The IHS input system of claim 8, wherein the wake engine is configured to deactivate the pen tip following at least one predetermined time period in which the pen tip is not detected engaging the IHS display screen.

15. A method for providing input to an IHS, comprising:
providing a pen including a power supply system, a pen tip, a wake engine that is coupled to the pen tip, and a motion activated device that is coupled between the power supply system and the wake engine;
deactivating the pen tip using the wake engine following at least one predetermined time period in which the pen tip is not detected engaging an IHS display screen on an IHS such that no power is drawn from the power supply system by the motion activated device, the pen tip, and the wake engine when the pen tip is deactivated;
coupling the power supply system to the wake engine using the motion activated device in response to detecting a movement of the pen when the pen tip is deactivated;
activating the pen tip for a first predetermined time period using the wake engine in response to coupling the power supply to the wake engine, wherein the activating of the pen tip configures the pen tip to provide an immediate input to the IHS through the IHS display screen when the pen tip is engaged with the display screen during the first predetermined time period; and extending the activation of the pen tip from the first predetermined time period to the a second predetermined time period that is longer than the first predetermined time period using the wake engine in response to the pen tip engaging a display screen during the first predetermined time period.

16. The method of claim 15, wherein the motion activated device includes an acceleration sensor.

17. The method of claim 16, wherein the wake engine is configured to determine an acceleration resulting from the movement of the pen, and wherein the wake engine activates the pen tip for the first predetermined time period in response to the acceleration resulting from the movement of the pen exceeding an predetermined acceleration threshold.

18. The method of claim 16, wherein the wake engine is configured to determine an axis of acceleration resulting from the movement of the pen, and wherein the wake engine activates the pen tip for the first predetermined time period in response to the axis of acceleration resulting from the movement of the pen being a predetermined axis.

19. The method of claim 15, wherein the first predetermined time period is approximately 10 seconds.

20. The method of claim 19, wherein the second predetermined time period is approximately 60 seconds.

* * * * *